United States Patent Office 3,563,971
Patented Feb. 16, 1971

3,563,971
NUCLEATION OF POLYPROPYLENE
Harold V. Wood and Terry D. Brown, Bartlesville, Okla., assignors to Phillips Petroleum Company, a corporation of Delaware
No Drawing. Filed Sept. 26, 1968, Ser. No. 762,970
Int. Cl. C08f 3/08, 3/10
U.S. Cl. 260—93.7
9 Claims

ABSTRACT OF THE DISCLOSURE

The crystal structure of propylene polymers is altered by the addition of a small concentration of a compound selected from those compounds of the formulas (A)
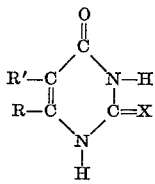

wherein X is O or S, and R or R' is a hydrogen atom or a methyl, ethyl, propyl, isopropyl or a carboxyl group; or (B)
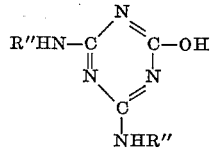

wherein R" is a hydrogen atom or an alkyl, aryl or cycloalkyl radical having from 1 to 12 carbon atoms therein.

---

This invention relates to the nucleation of propylene polymers.

Frequently it has been found desirable to modify the crystalline structure of the various olefin polymers. In particular with such relatively new members of this class of polymers as high density polyethylene and polypropylene, it has been found possible to greatly alter the physical properties by adding various materials to the polymer to nucleate the formation of crystals. This is because in many of these polymers, large crystal structures known as spherulites form on cooling the polymers to a point below their crystalline freezing point. The addition of nucleating agents results in the formation of a crystal structure which is substantially free of large spherulites. This results in a polymer with physical properties which are better suited for certain applications. For instance, it results in a polymer having greater transparency which is desirable in many film applications. Also it results in a polymer of increased flexural modulus or stiffness which makes possible the fabrication of parts of thinner cross-section having rigidity comparable to those made from thicker sections of polymer not containing a nucleating agent.

Several materials have been disclosed in the prior art as being of varying degrees of value as nucleating agents for certain polymers. While some effort has been made to characterize the type of agents which are effective—see for instance J. Polymer Science, vol. 39, page 544 (1959)—for the most part the reasons some materials are effective and others are ineffective has gone unexplained except that it is generally thought that the nucleating agent must have a higher melting point than the base polymer so that it can provide solid particles around which the polymer crystals can form. Some materials will function as nucleating agents for polypropylene, for instance, but are ineffective in polyethylene. Materials proposed to date as nucleating agents include certain finely divided inorganic materials, polycarboxylic acids and even other polymers.

It is an object of this invention to provide propylene polymers with improved physical properties.

It is a further object of this invention to provide propylene polymers with improved optical properties.

It is a still further object of this invention to provide propylene polymers with increased flexural modulus.

It is a further object of this invention to provide propylene polymer compositions suitable for fabricating into products of improved optical and other physical properties.

Other aspects, objects, and the several advantages of the invention are apparent from a study of the disclosure and appended claims.

In accordance with the present invention, we have discovered that compounds of the formulas (A)
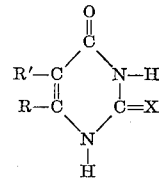

wherein X is O or S, and R or R' is a hydrogen atom or a methyl, ethyl, propyl, isopropyl or a carboxyl group; or (B)
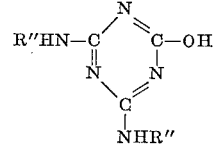

wherein R" is a hydrogen atom or an alkyl, aryl or cycloalkyl or combinations thereof such as alkaryl, alkylcycloalkyl, etc. radical having from 1 to 12 carbon atoms therein, function as nucleating agents to provide an improved propylene polymer composition.

Examples of suitable compounds of the Formula (A) are 2-thiouracil
6-methyl-2-thiouracil
2-thiouracil-6-carboxylic acid
Uracil
6-methyluracil
5,6-diethyl-2-thiouracil
5,6-diisopropyl-2-thiouracil
Uracil-6-carboxylic acid, and
5-methyl-uracil-6-carboxylic acid.

Illustrative examples of suitable compounds of the Formula (B) are 4,6-bis(ethylamino)-s-triazine-2-ol
4,6-diamino-s-triazine-2-ol
4-ethylamino-6-amino-s-triazine-2-ol
4,6-bis(isopropylamino)-s-triazine-2-ol
4-cyclohexylamino-6-amino-s-triazine-2-ol
4-ethylamino-6-propylamino-s-triazine-2-ol
4-dodecylamino-6-amino-s-triazine-2-ol
4,6-bis(dodecylamino)-s-triazine-2-ol
4,6-bis(phenylamino)-s-triazine-2-ol
4,6-bis(methylcyclohexylamino)-s-triazine-2-ol, and
4,6-bis(phenylbutylamino)-s-triazine-2-ol.

Applicable polymers for use in the practice of this invention include homopolymers and copolymers of propylene. These polymers can be produced by any of the methods well known in the art. A particularly suitable polymerization method for preparing olefin polymers and copolymers for use in the instant invention is that described in U.S. 2,825,721 to Hogan et al. Another suitable method for preparing olefin polymers and copolymers for use in the instant invention is that utilizing the well-known organometal catalyst systems comprising a transition metal compound such as a titanium halide and a reducing compound such as an aluminum alkyl.

The nucleating agents can be incorporated into the polymers by any known manner such as by melt blending, dry blending or solution blending. The concentration of additive can be very low for instance between 0.005 and 1 weight percent based upon the weight of the polymer, preferably between 0.01 and 0.1 weight percent.

In order to effect the modification of crystal structure the polymer must be crystallized from the melt phase. If melt blending is used, then the modified crystal structure will result on the initial cooling. If a technique such as dry blending is used, the polymer must be melted and then recrystallized; this is of no disadvantage however since the polymer will be generally melted during the fabrication step. Of course the polymer can be melted and recrystallized a number of times if desired.

The polymer can contain other additives such as antioxidants, UV stabilizers, pigments and the like.

The following examples will further illustrate the invention.

EXAMPLE I

A pelletized polypropylene having a melt flow 6.20 and stabilized with 0.15 weight percent 2,6-di-tert-butyl-4-methylphenol and 0.15 weight percent dilaurylthiodipropionate was dry blended with the nucleating agents. The blend was masticated in a plastograph for five minutes at 190° F. at 50 r.p.m. under nitrogen. Test samples were molded at 425° F. The results are tabulated below.

TABLE I

| Sample No. | Melt Flow $^a$ | Flex. mod.$^b$ ×10$^{-3}$ | DTA °C.$^c$ MP | FP | Additive .2% wt. |
|---|---|---|---|---|---|
| 1 (Control) | 6.20 | 212 | 163 | 116 | None. |
| 2 | 4.63 | 245 | 162 | 129 | 4,6-vis(ethylamino)-s-triazine-2-ol. |

$^a$ ASTM D 1238-62T, Condition L.
$^b$ ASTM D 790-63.
$^c$ By differential thermal analysis.

The results show the excellent nucleating properties of the triazine derivative. It not only substantially increased the freezing point but also significantly increased the flexural modulus.

EXAMPLE II

A homoploymer of proplyene, containing 0.15 part by weight 2,6-di-tert-butyl-4-methylphenol and 0.15 part by weight dilaurylthiodipropionate was used. Except for the control, the polymer and the nucleating agents listed below were dry blended and then masticated in a plastograph for five minutes at 190° C., 50 r.p.m. under nitrogen. Test samples were molded at 425° F. The results are tabulated below.

TABLE II

| Sample No. | Melt flow $^a$ | Flex. mod.$^b$ | DTA °C.$^c$ MP | FP | Additive |
|---|---|---|---|---|---|
| 1 (Control) | 6.20 | 212 | 163 | 116 | None. |
| 2 | 4.78 | 215 | 164 | 122 | 0.2% 2-thiouracil. |
| 3 | 4.66 | 238 | 163 | 128 | 0.2% 6-methyl-2-thiouracil. |
| 4 | 5.45 | 228 | 164 | 122 | 0.2% 2-thiouracil-6-carboxylic acid. |
| 5 | 4.42 | 229 | 162 | 123 | 0.2% uracil. |

$^a$ ASTM D 1238-62T, Condition L.
$^b$ ASTM D 790-63.
$^c$ By differential thermal analysis.

It is readily apparent that the additives improve the nucleation properties of polypropylene, as shown by the increase in freezing point and simultaneously increase the flexural modulus which is desirable in the production of shaped articles from the polymer. The improved microstructure of the polymer also improves the clarity of the shaped articles.

Reasonable variations and modifications are possible within the scope of this disclosure without departing from the spirit and scope thereof.

We claim:

1. A nucleated composition comprising a polymer of propylene and from 0.005 to 1.0 weight percent, based on the weight of said polymer of a nucleating compound selected from the group consisting of (a) compounds of the formula $$\begin{array}{c} O \\ \parallel \\ R'-C \diagup C \diagdown N-H \\ R-C \diagdown \quad \diagup C=X \\ N \\ | \\ H \end{array}$$

wherein X is O or S, and R or R' is a hydrogen atom or a methyl, ethyl, propyl, isopropyl or a carboxyl group; and (b) compounds of the formula $$\begin{array}{c} N \\ R''HN-C \diagup \diagdown C-OH \\ \parallel \quad \parallel \\ N \diagdown \quad \diagup N \\ C \\ | \\ NHR'' \end{array}$$

wherein R'' is a hydrogen atom or an alkyl, aryl or cycloalkyl radical having from 1 to 12 carbon atoms therein.

2. A composition according to claim 1 wherein said nucleating compound is a compound of the formula $$\begin{array}{c} O \\ \parallel \\ R'-C \diagup C \diagdown N-H \\ R-C \diagdown \quad \diagup C=X \\ N \\ | \\ H \end{array}$$

wherein X is O or S and R or R' is a hydrogen atom or a methyl, ethyl, propyl isopropyl or a carboxyl group.

3. A composition according to claim 1 wherein said nucleating compound is a compound of the formula $$\begin{array}{c} N \\ R''HN-C \diagup \diagdown C-OH \\ \parallel \quad \parallel \\ N \diagdown \quad \diagup N \\ C \\ | \\ NHR'' \end{array}$$

wherein R'' is a hydrogen atom or an alkyl, aryl or cycloalkyl radical having from 1 to 12 carbon atoms therein.

4. A composition according to claim 2 wherein said agent is 2-thiouracil.

5. A composition according to claim 2 wherein said agent is 6-methyl-2-thiouracil.

6. A composition according to claim 2 wherein said agent is 2-thiouracil-6-carboxylic acid.

7. A composition according to claim 2 wherein said agent is uracil.

8. A composition according to claim 3 wherein said agent is 4-6-bis(ethylamino)-s-triazine-2-ol.

9. A method for modifying the crystal structure of polylylene comprising: admixing with said polymer between 0.005 and 1.0 weight percent, based on the weight of the polymer, of a nucleating agent selected from those of the formula

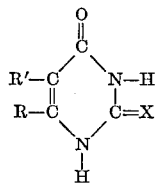

wherein X is O or S and R or R' is a hydrogen atom or a methyl, ethyl, propyl, isopropyl or a carboxyl group; and those of the formula

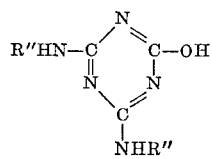

wherein R'' is a hydrogen atom or an alkyl, aryl or cycloalkyl radical having from 1 to 12 carbon atoms therein; and crystallizing the resulting mixture from a melt phase.

References Cited
UNITED STATES PATENTS

| | | | |
|---|---|---|---|
| 3,207,735 | 9/1965 | Wijga | 260—93.7 |
| 3,268,499 | 8/1966 | Wales | 260—93.7 |

JOSEPH L. SCHOFER, Primary Examiner

W. F. HAMROCK, Assistant Examiner

U.S. Cl. X.R.

260—94.9, 96